M. P. JACKSON.
Milk-Agitator for Cheese-Vats.

No. 213,755.  Patented April 1, 1879.

WITNESSES
Nat. E. Oliphant
Julia Heylmun.

INVENTOR
Morgan P. Jackson
by
Heylmun & Kane
attys.

UNITED STATES PATENT OFFICE.

MORGAN P. JACKSON, OF BOONVILLE, NEW YORK.

IMPROVEMENT IN MILK-AGITATORS FOR CHEESE-VATS.

Specification forming part of Letters Patent No. 213,755, dated April 1, 1879; application filed December 18, 1878.

*To all whom it may concern:*

Be it known that I, MORGAN P. JACKSON, of Boonville, in the county of Oneida and State of New York, have invented a new and valuable Improvement in Apparatus for Agitation of Milk in Cheese-Vats; and I do hereby declare that the following is a full, clear, and exact description of the construction and operation of the same, reference being had to the annexed drawings, making a part of this specification, and to the letters and figures of reference marked thereon.

Figure 1:
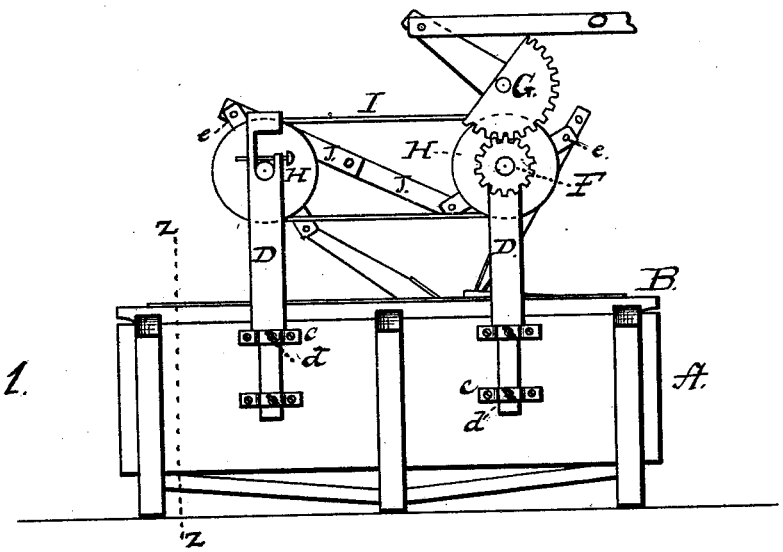
Figure 2:
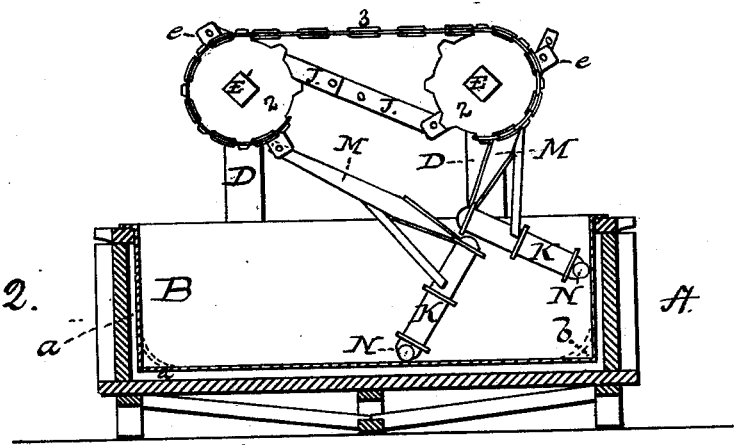
Figure 3:
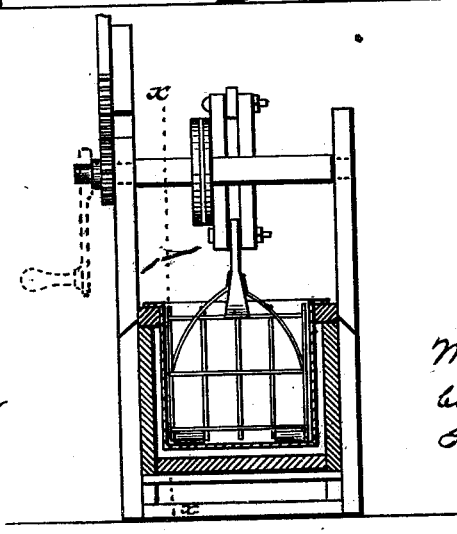

Figure 1 of the drawings is a representation of a side view of my improved machine. Fig. 2 is a longitudinal sectional view of the same, showing a modification in the gearing, taken through the line $x\ x$ of Fig. 3. Fig. 3 is a transverse section, taken through the line $z\ z$ of Fig. 1.

The object of this invention is to provide means in connection with a cheese-vat which will greatly facilitate the separation of the whey from the curd; and the novelty consists in the combination, with a cheese-vat and a pair of suspended curd-cutters, of an operating mechanism, substantially as hereinafter set forth, to cause the said cutters to alternately cross and recross the center of the vat, and the novel combination and arrangement of parts, as will be hereinafter more fully set forth.

In the annexed drawings, forming a part of this specification, the letter A represents the outside casing or jacket of a cheese-making apparatus suitably supported upon legs, within which is arranged the metal vat-pan B. Between the casing and vat-pan is a chamber or space, $a$, for warm water or steam to circulate around the pan containing the curd to heat the contents. The bottom ends or corners $b$ of the vat-pan B may be curved or have a gradual inclination, as indicated by dotted lines in Fig. 2 of the drawings.

Upon the exterior frame or casing are a series of sockets, $c$, provided with set-screws $d$, or equivalent fastening devices, to receive the standards D, supporting the operating mechanism. The office of the sockets and set-screws is to prevent any displacement of the standards while in position.

The mechanism for operating the curd-cutters, hereinafter described, consists substantially of the two transverse shafts E E', journaled in the standards D, pinion F, segment G, and band-pulleys H, with their connecting band or belt I, substantially as shown in Fig. 1 of the drawings. The shafts E E' are further connected by the jointed arms J J, pivoted to the cross-arms $e$ of the shafts. At the other or opposite end of the cross-arms $e$ are pivoted the curd-cutters and agitators K K. These curd-cutters and agitators, for cutting and working the curd in the vat-pan, to facilitate the escape of whey, are substantially of the construction as shown in my Letters Patent dated May 1, 1877, No. 190,219, but are of the same, or nearly the same, width as that of the vat-pan.

It will be noticed that these curd-cutters and agitators referred to are composed of a number of longitudinal double-edged cutting-blades and cross-blades, with cutting-edges securely fastened.

The two outermost or exterior blades are designed to extend slightly beyond the others and to be provided at their extremities with slots to receive guards or cushions made of leather or other suitable material, or the blades extended to receive a journaled anti-friction roller or wheel, as shown at N, to prevent cutting, scraping, or otherwise injuring of the vat-pan in the working of the cutters and agitators. These cutters are each provided with a handle or stem, M, extending upwardly and forming a pivoted connection with the arms $e$ of the shafts.

The curd-cutters are suitably braced to prevent the handle and blades from springing or twisting out of place under strain or pressure, and adding firmness and rigidity to the cutters. From the upper end of the segment G is a pitman, O, extending to the driving power.

Operation: Motion being communicated through the medium of the pitman O to the segment G, engaging with pinion F, causes a semi-rotary or oscillatory motion to the pinion, which in return gives a similar motion to the shaft E, carrying one of the curd-cutters. Power is communicated to the shaft E', carrying another curd-cutter, through the intervention of the pulleys H H and belt, or their equivalents, thus causing the curd-cutters to be alternately moved forward, upward, and thence swung downward, backward, and upward through the cheese-curd in the vat-pan.

In this movement of the curd-cutters, it will be observed that they pass the line of center, as shown in Fig. 2 of the drawings—in other words, cross and recross the center of the vat—so that all the parts of the curd in the vat will be acted upon by the cutters. This crossing and recrossing of the cutters in their movement at the center or beyond the center of the vat is material as well as important; otherwise the portion of the cheese-curd at the center of the vat would not be acted upon. The result of this operation is that the curd is uniform in texture, and that in consequence more cheese and of a better quality is produced. This crossing and recrossing of the curd-cutters can be regulated by adjusting the standards D, carrying the operative shafts E E' and cross-arms e, from which the curd-cutters are suspended, nearer together, and by provisions in the lower end of the cross-arms e and similar provisions in the handles.

After the formation of the cheese-curds the cutters are removed from the operating mechanism for the removal of the cheese-curd to its proper place to undergo the process of cheese-making, rinsed with clean water, and hung up to dry.

In some cases the standards supporting the operating mechanism are bodily removed from the vat by unloosing the fastening-screws, so that the cheese-curd can be more readily removed and the vat-pan easily cleansed. I have also made provision by forming slots in the standards to remove the shafts when desired. Preference, however, is given to sectional journal-boxes attached to the sides of the standards for supporting these oscillating shafts.

In lieu of the pulleys mounted on the shafts and the belt, I can use the sprocket-wheels 2 2 and the sprocket-chain 3, as shown in Fig. 2 of the drawings, to produce substantially the same result.

The curd-cutters, which also act as agitators, can be operated through the instrumentalities of the mechanism, substantially as described, by steam, hydraulic, pneumatic, horse, or dog power, and small vats in small factories by hand-power.

What I claim as my invention is—

1. In combination with a cheese-vat and a pair of suspended curd-cutters, the operating mechanism, substantially as described, to cause the said cutters to alternately cross and recross the center of the vat, for the purpose hereinbefore described.

2. The combination, with a cheese-vat, of gearing G F, pulleys H H, and belt I, the adjustable connecting-arms J J, and the adjustable curd-cutters K K, substantially as described.

In testimony whereof I have hereunto subscribed my name.

MORGAN P. JACKSON.

Witnesses:
D. D. KANE,
NAT. E. OLIPHANT.